United States Patent

[11] 3,627,586

| [72] | Inventor | Jean Firmin Jammet<br>Poitiers, France |
|---|---|---|
| [21] | Appl. No. | 884,208 |
| [22] | Filed | Dec. 11, 1969 |
| [45] | Patented | Dec. 14, 1971 |
| [73] | Assignee | Societe des Accumulateurs Fixes et de Traction (Societe Anonyme)<br>Romainville, France |
| [32] | Priorities | Dec. 12, 1968 |
| [33] | | France |
| [31] | | 178012;<br>Oct. 23, 1969, France, No. 6936443; Oct. 23, 1969, France, No. 6936444 |

[54] SEALED CYLINDRICAL ELECTROCHEMICAL CELL
16 Claims, 18 Drawing Figs.

[52] U.S. Cl. .................................................. 136/107, 136/128
[51] Int. Cl. ..................................................H01m21/06
[50] Field of Search........................................ 136/107, 102, 83, 128

[56] References Cited
UNITED STATES PATENTS

| 1,318,364 | 10/1919 | Dunn............................ | 136/107 |
| 3,168,420 | 2/1965 | Jammett....................... | 136/107 |
| 3,185,593 | 5/1965 | Coleman et al.............. | 136/107 |
| 3,338,750 | 8/1967 | Urry............................. | 136/107 |
| 3,420,714 | 1/1969 | Knight.......................... | 136/107 |
| 3,442,716 | 5/1969 | Muraki et al. ................ | 136/83 |
| 3,510,358 | 5/1970 | Nabiullin et al. ............. | 136/107 |
| 3,575,724 | 4/1971 | Jammet et al................. | 136/107 |

*Primary Examiner*—Winston A. Douglas
*Assistant Examiner*—C. F. Lefevour
*Attorney*—Kenyon & Kenyon Reilly Carr & Chapin ABSTRACT: Sealed electrochemical cells, preferably of cylindrical shape comprising a rodlike positive electrode surrounded by a depolarizing mix and separator enclosed within an overall cylindrically shaped cuplike negative electrode formed from sheet metal which is mechanically folded and bowed to provide a bottom and cylindrically shaped side walls having at least one longitudinal slot. A synthetic plastic casing is molded in situ about the negative electrode. After assembly of the positive electrode, depolarizing mix and separator and other required cell components with this negative electrode bearing said synthetic casing, an insulative closure member is mounted on the assembly to seal the contents of the casing surrounded negative electrode. The positive electrode projects through this cover and optionally a metal cap covers the protruding end of the positive electrode. The bottom of the negative electrode is either directly left uncovered by the casing to constitute the negative terminal of the generator. In the alternative, a metallic cup in electrical contact with said bottom is left partially uncovered by the casing to constitute the negative terminal. This cup may be ribbed, if desired.

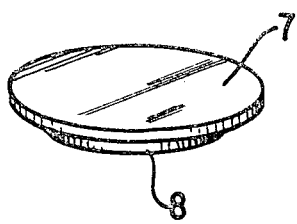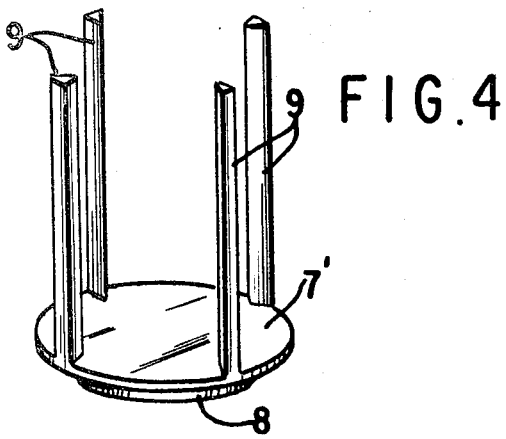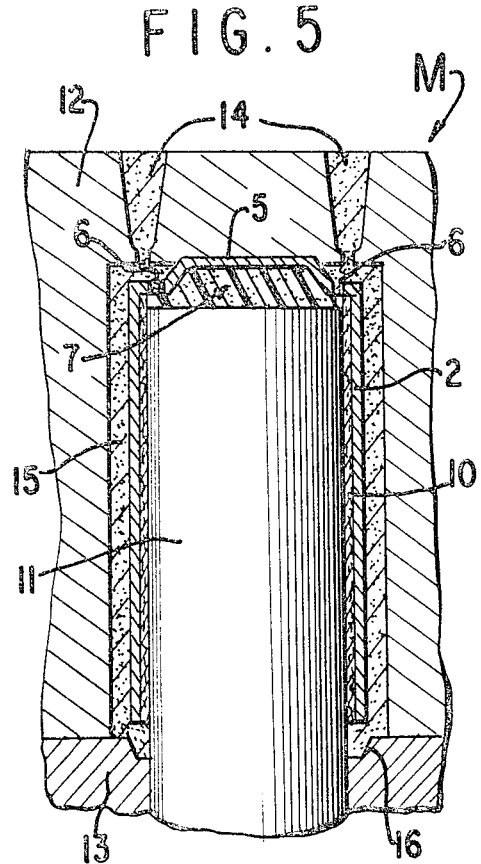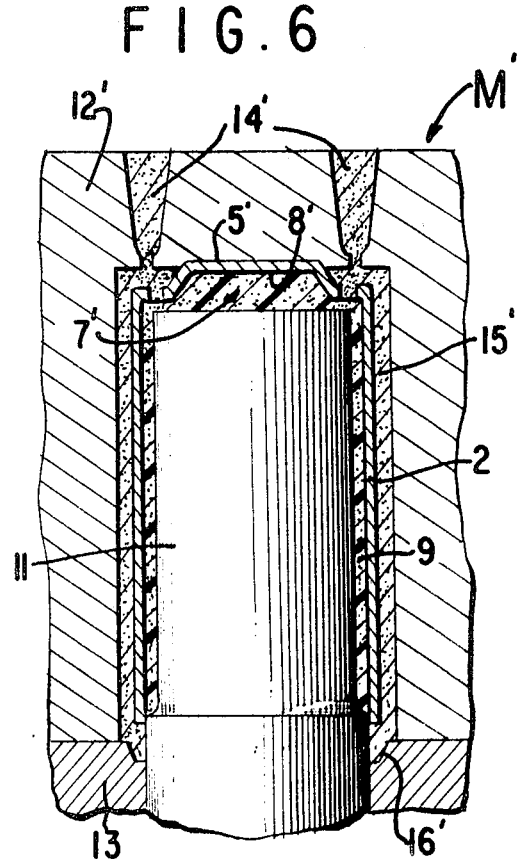

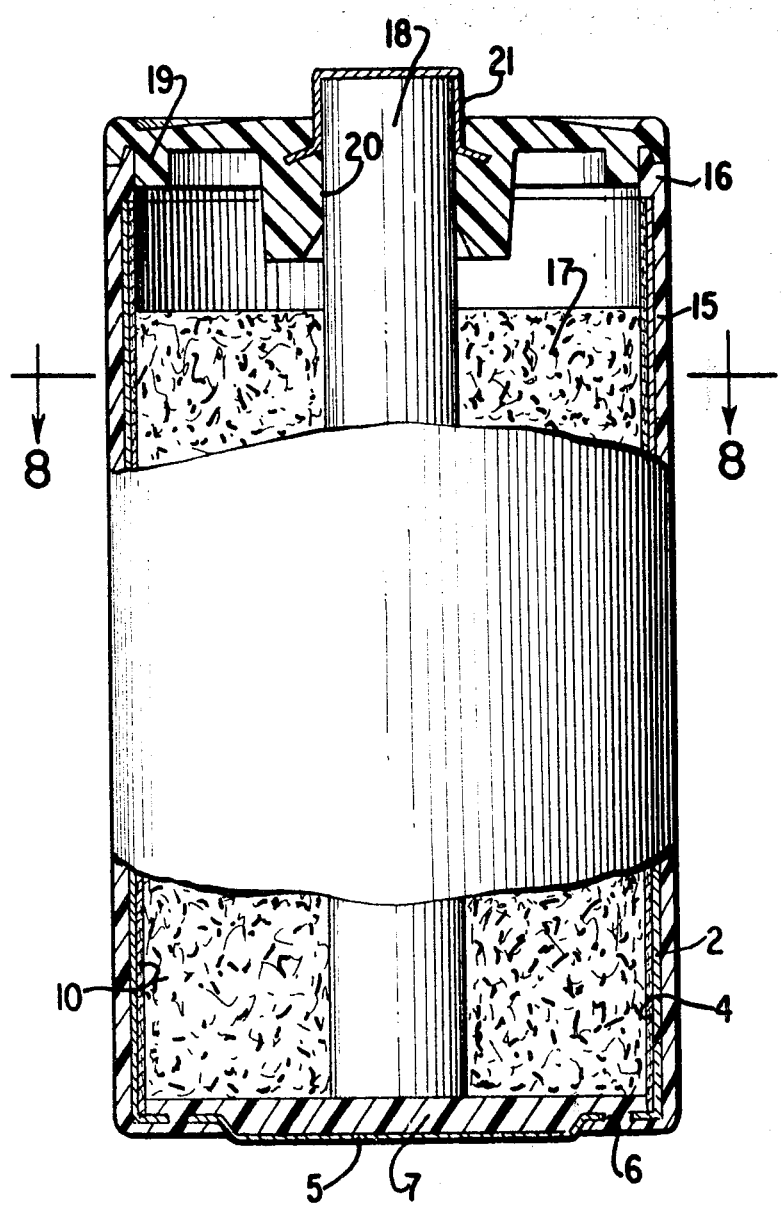

INVENTOR
JEAN FIRMIN JAMMET
BY
ATTORNEYS

SEALED CYLINDRICAL ELECTROCHEMICAL CELL

BRIEF SUMMARY OF INVENTION

This invention relates to a sealed cylindrical electrochemical cell of the type comprising a negative electrode having the shape of a cylindrical cap cooperating with a depolarizer mass provided with a conductive rod used as positive electrode, the end of the rod protruding from the cell being optionally covered with a metal cap constituting the positive terminal of the cell.

Generally, the metal cups used in such cells are made of zinc and are manufactured by impact-extrusion from disc shaped ingots. This manufacturing method involves metal losses, particularly the following ones:

waste when the ingot discs are cut off; and waste when the extruded cylindrical tube is cut to the required dimensions.

It should also be noted that when such cups are made by impact-extrusion, their surfaces may receive incrusted iron particles from the extrusion machinery which caused local couples detrimental to the shelf life of the cell, utilizing such cups.

Moreover, with metals such as magnesium the manufacture of cups by impact-extrusion is very difficult.

The present invention remedies the above-mentioned drawbacks; its purpose is to provide a cylindrical electrochemical cell, more particularly a primary dry cell, having a simple structure and an excellent resistance to leakage.

A principal object of the invention is the provision of a sealed cylindrical electrochemical cell of the type comprising a negative electrode having the shape of a cylindrical cup cooperating with a depolarizer mass provided with a conductive rod used as positive electrode, the end of the rod protruding from the cell being optionally covered with a metal cap constituting the positive terminal of the cell, said cell being characterized by the fact that an equivalent form is substituted for the cup, such form being derived from a metal sheet and comprising a bottom and a cylindrical wall which is slotted substantially in its whole height along at least one generatrix, said form being then outwardly coated, except on the central portion of its bottom, by an insulative casing molded in situ, made of synthetic material which in the molding step also fills up the above-mentioned slits.

Another object of the invention is to provide a novel method for manufacturing such a cell.

Said method is characterized in the fact that the negative electrode is made from a metal sheet by, in a first step, cutting said sheet, then in the second step substantially shaping a cup from the thus cut sheet by means of a mechanical operation involving folding and bowing, the application of the synthetic casing being realized in a third step by molding operation in situ.

It is possible with this method to make negative electrodes from materials which do not easily lend themselves to the impact-extrusion operation, such as magnesium, for instance.

According to an embodiment of the invention, the central portion of the bottom of said form may present an outwardly directed protuberance to provide the negative terminal of the cell.

According to another embodiment of the invention, the negative electrode may present the form of a cylinder slotted along at least one generatrix and linked by at least one strip to a disc which constitutes the bottom of the negative electrode.

According to another characteristic of the invention a metal cup may be fitted or applied externally to the lower part of the negative electrode, the cylindrical portion of the said metal cup engaging the lower cylindrical portion of the negative electrode, the molded synthetic material casing covering the said metal cup except on the central portion of the bottom of this metal cup, the said central portion of the said bottom then constituting the negative terminal of the cell.

Advantageously, at least a portion of the metal cup bottom is in electrical contact with the bottom of the negative electrode. When the negative electrode bottom is provided with a protuberance the metal cup bottom may be given a corresponding shape; when the negative electrode bottom is flat, the metal cup bottom may advantageously be provided with protruding portions such as ribs.

The metal cup which may, for instance, be made of tin coated iron sheet, may be spot welded at selected points to the negative electrode so that a better electrical contact is obtained between the two parts.

This metal cup is, of course, placed on the bottom of the negative electrode before the molding of the synthetic casing.

One advantage of this metal cup is that it prevents leakage at the lower part of the cell, such leakage being liable to occur during prolonged discharges due to a local consumption of the negative electrode bottom throughout its thickness, particularly when the said electrode is made of zinc.

Other objects, features and characteristics of the invention will become apparent from the following description and the annexed drawings forming part hereof, in which:

FIG. 3 is a perspective view of one form of an insulating disc to be used in a cell according to the invention;

FIG. 4 is another embodiment of such disc somewhat different from that of FIG. 3;

FIG. 5 is a diagrammatic and partly sectional view of the device used for molding the synthetic casing on the negative electrode when an insulating disc such as that of FIG. 3 is used in the cell;

FIG. 6 shows another embodiment of the device for purposes similar to that of FIG. 5 when the use is made of the insulating disc shown in FIG. 4;

FIG. 7 is a vertical sectional view of a cell according to the invention with the disc of FIG. 3 taken along lines 7—7 of FIG. 8;

DETAILED DESCRIPTION

Figure 1:
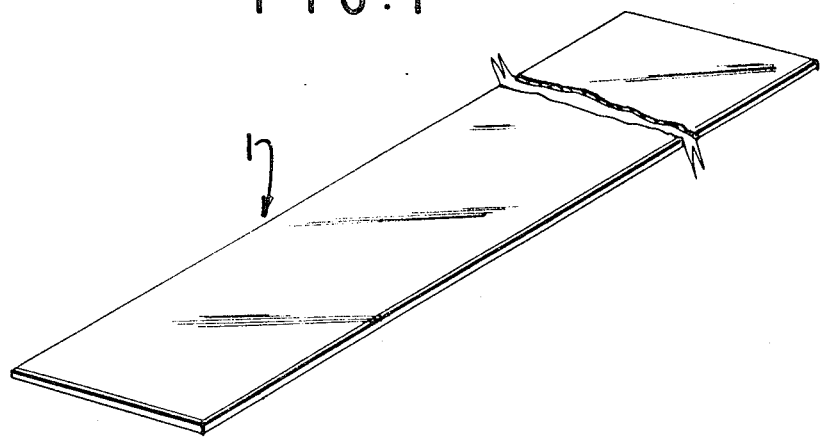
FIG. 1 is a perspective view of a metal sheet used for realizing one embodiment of a negative electrode according to the invention.

In FIG. 1, a rectangular metal sheet 1 of zinc or magnesium, for example, constitutes the active material of the negative electrode. The width of this sheet substantially corresponds to the diameter which the bottom of the electrode is to have. Its length substantially corresponds to twice the desired height of the electrode plus the diameter of its bottom.

According to the invention, this sheet 1 is submitted to an operation of stamping-folding-bowing, thus not only shaping the bottom of the electrode in the center of the sheet but also folding and forming the two portions of the sheet on both sides of the bottom in order to obtain the lateral walls of the negative electrode.

It should be noted that the operation effecting the stamping, folding and bowing of the sheet 1 according to the invention can be done with presses that are much less massive than those required for impact-extruding of negative electrode cups.

Figure 2:
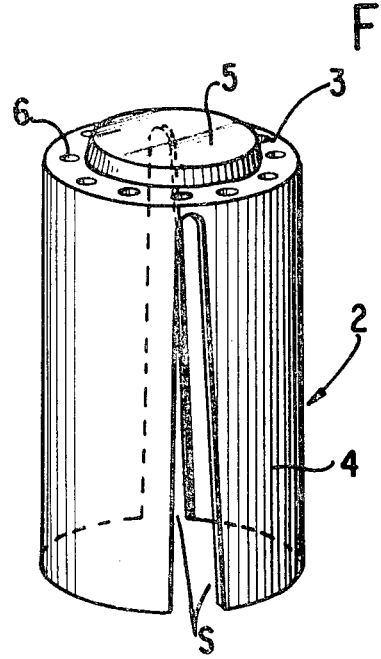
FIG. 2 is a perspective view of a negative electrode according to the invention made from the sheet shown in FIG. 1.

FIG. 2 is a perspective view of an electrode 2 obtained after the stamping-folding-bowing operation of sheet 1. The bottom of the electrode is referenced 3 and the vertical lateral walls 4.

During the stamping operation a protuberance 5 has been formed on the bottom 3 of the electrode in its central portion in order to constitute the negative terminal of the cell. Around this protuberance, perforations 6 are provided for a purpose which will become apparent hereafter; such perforations may be made during the stamping operation.

FIG. 3 is a perspective view of an insulating disc 7 which is to be placed inside the negative electrode 2 and presents a protuberance 8 having a shape complemental to the hollow defined by 5 in the bottom 3 of the electrode 2. This disc 7 may be obtained by a molding operation.

FIG. 4 shows another embodiment of a disc 7' somewhat different from that of FIG. 3; it differs from that of FIG. 3 in that means have been provided on said disc 7' in order to assist in centering the depolarizer mass of the cell in the negative electrode 2. Said means comprise rods 9 substantially perpendicular to the plane of the disc; in the drawing the disc 7' has been shown as provided with four rods 9 made of synthetic material integral with disc 7' but only three may, of course, be provided, or alternatively a greater number. The disc 7' provided with such rods 9 of insulating material may, of course, also be obtained by a molding operation.

If the so-called "paper-lined" technique is used, a suitable separator is placed inside the electrode 2, then the disc of FIG. 3 and thereafter the synthetic casing, e.g., of polystyrene, is applied by a molding operation.

However, the disc 7' could first be put in its place, then the molding operation for applying the synthetic casing could be performed and lastly the separator could be put inside the casing electrode combination.

If, on the other hand, the separator is constituted by a gel, preferably obtained without cooking, the disc 7' of FIG. 4 is advantageously used.

FIG. 5 diagrammatically shows the device used for molding the synthetic casing on the electrode 2. Electrode 2 provided with separator 10 and disc 7 is placed on die 11 of a mold M.

After closing the mold M by means of its parts 12 and 13, the synthetic material which is to constitute the external casing 15 around electrode 2 is injected through the injection nozzles 14.

Advantageously, the insulating disc 7 is made of the same material as the synthetic casing and when the synthetic material is injected bridges of synthetic material are created between the casing 15 and disc 7 through the perforations 6 of electrode 2. As a consequence, the bottom 3 of the electrode, except for the protruding portion 5, is encased between casing 15 and disc 7.

The molding of synthetic casing 15 is effected so that the outer surface of protuberance 5 of electrode 2 is left bare.

During molding the synthetic material used to form casing 15 also fills up the slots S of the electrode 2, thus creating an elastic joint, which confers the ability of bearing some dilatation to the cell.

The embodiment shown in FIG. 5 corresponds to the case where the separator 10 has been inserted in electrode 2 before the disc 7 is inserted in the electrode. The separator 10, which may be constituted by a sheet already impregnated or pasted with electrolyte, may in this case be placed in the electrode 2 either after the latter has been shaped or before; in the latter case the electrode is made of a rectangular metal sheet 1 bearing a separator sheet on the face which is to constitute the inner wall of the electrode.

As has been explained, the separator 10 may also be inserted into the electrode 2 before or after molding.

FIG. 6 diagrammatically shows a device M' similar to that of FIG. 5 modified, however, to permit use of the disc 7' of FIG. 4 instead of disc 7 of FIG. 3, thus making it possible to use a gellike separator instead of a separator 10 of FIG. 5.

As shown in FIGS. 5 and 6, the synthetic casing 15 forms above the edge of electrode 2 a ledge 16 which serves to anchor the negative electrode 2 in the plastic material of said casing and for compensating for any irregularity in the wall height of the negative electrode 2 so that each casing-electrode unit has a constant height.

According to the invention, the operation of trimming the negative electrodes to standard dimensions can thus be dispensed with.

After the molding of the synthetic casing 15 about electrode 2 the cup is filled with the other constituents of the cell.

FIG. 7 is a vertical sectional view of a cell according to the invention completed after the molding operation of the synthetic casing 15 about electrode 2 as shown in FIG. 5. The sausage-shaped depolarizer mass 17 is introduced in the cup 2, then the carbon rod 18 is driven in the mass, which causes a compression on the depolarizer mass 17 which is thus pushed into close engagement with separator 10, which separator 10 then closely engages the inner cylindrical wall 4 of the electrode 2. A cover 19 made of synthetic insulating material fitting over ledge 16 of casing 15 and comprising a central bore 20 tightly surrounding the upper end of the carbon rod 18 closes the space inside casing 15.

A metal cap 21 covers the end of carbon rod 18. In the example shown, cover 19 has had cap 21 molded into it.

In order to promote the venting of gases evolved in the cell during discharge when they reach a given overpressure, the carbon rod 18 may be made sufficiently porous and the cap 21 may be perforated.

It would also be possible in order to allow gases to diffuse somewhat outwards, to give a smaller thickness to the whole or to a portion of cover 19. The cover 19 and the ledge 16 of the casing 15 may be fastened by any suitable means preventing leakage, such as by glueing or ultrasonic welding.

Figure 8:
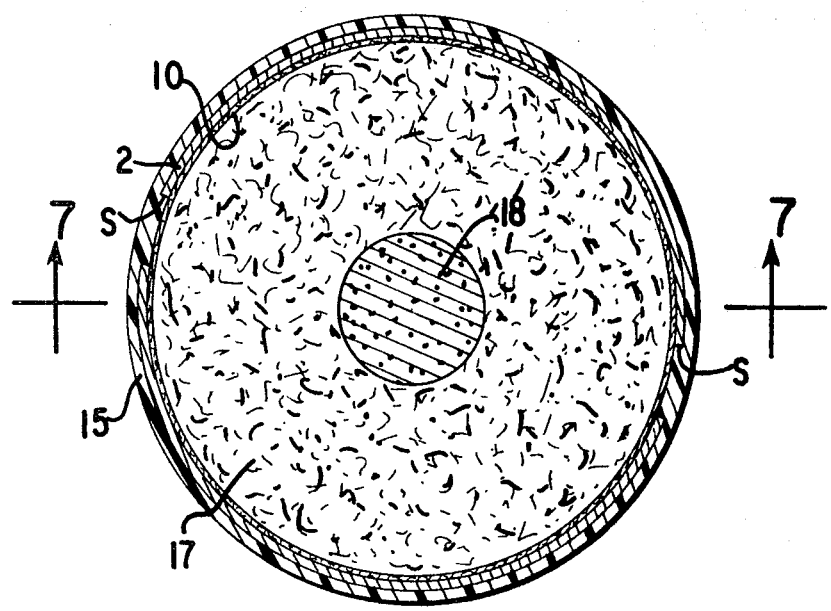
FIG. 8 is a cross-sectional view of FIG. 7 taken along line 8—8 of the latter.

FIG. 8 is a cross section of FIG. 7 taken along line 8—8 of this latter figure.

Figure 9:
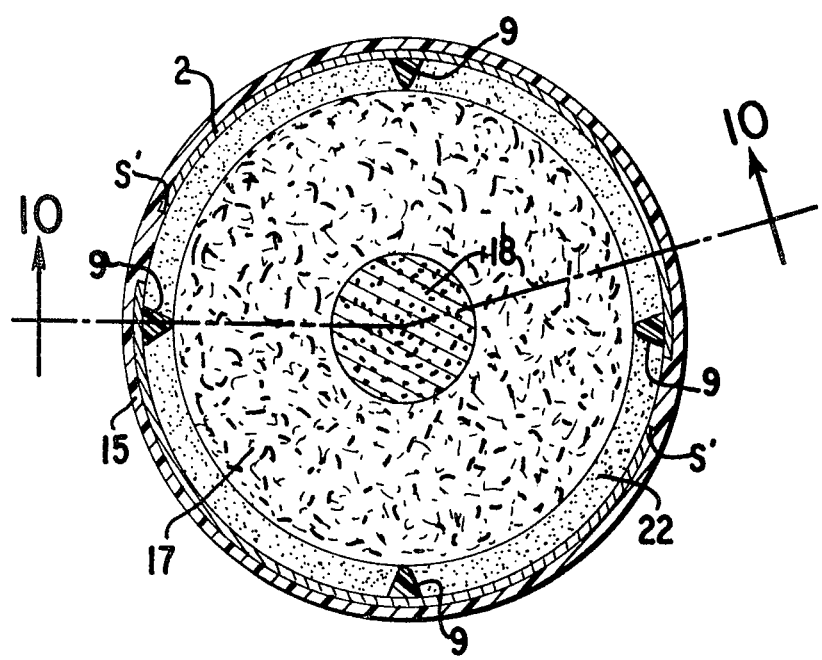
FIG. 9 shows another embodiment of the cell made with the insulating disc of FIG. 4 instead of that of FIG. 3.
Figure 10:
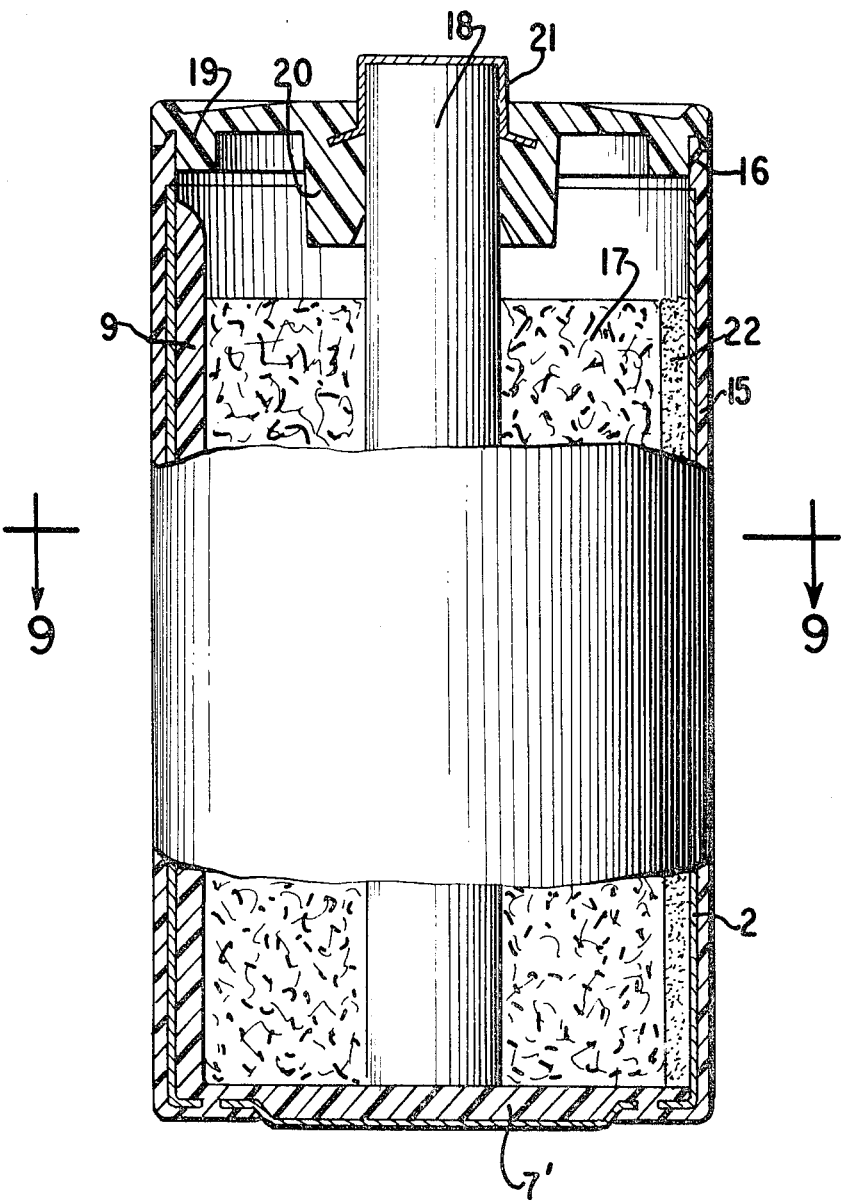
FIG. 10 is a sectional view of FIG. 9 taken along line 10—10.

FIGS. 9 and 10 respectively show an embodiment different from that of the cell of FIGS. 7 and 8 involving the use of an insulating disc 7' such as shown in FIG. 4 instead of the disc 7 of FIG. 3.

In this latter embodiment, after molding the casing 15 on the electrode 2 while the insulating disc 7' provided with rods 9 was in its place inside the electrode, the depolarizer mass 17 is put in the electrode after the electrolyte gel 22 which replaces separator 10 of FIG. 8 has been introduced, and the cell is completed as hereinabove explained.

FIG. 10 is a sectional view of the cell of FIG. 9 taken along line 10—10 of the latter.

Figure 11:
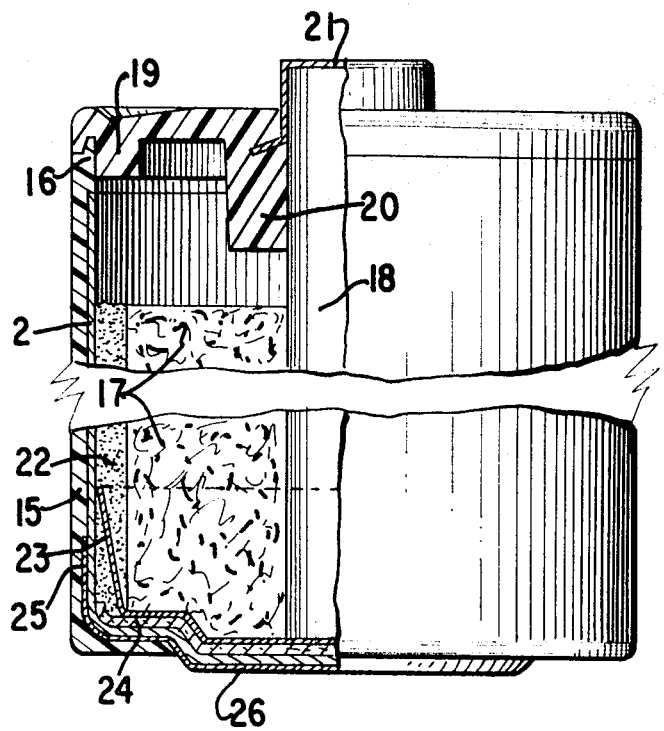
FIG. 11 is a partly sectional view of another embodiment of a cell according to the invention.
Figure 12:
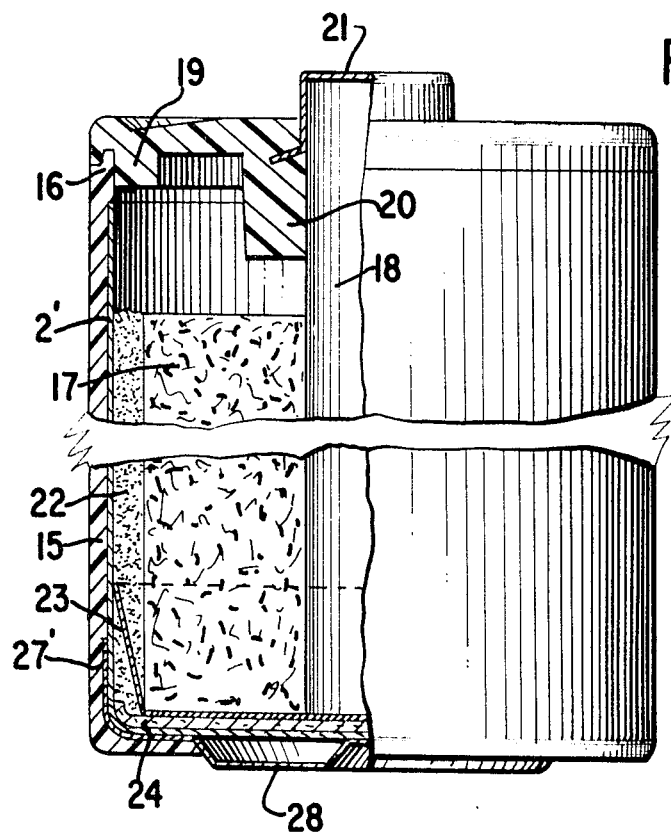
FIG. 12 shows still another embodiment of a cell which is a modified form of that of FIG. 11.

FIGS. 11 and 12 are partly sectional views of other cells embodying the invention, the negative electrode of which have been obtained by the hereabove described method.

In FIG. 11, the negative electrode 2 is similar to that shown in FIG. 2.

According to this embodiment of the invention, a metal cup 25, e.g., made of tin coated sheet iron, and with a bottom provided with a protuberance 26 complemental to the protuberance 5 of electrode 2 is tightly fitted, either by frictional forcing or by a diameter reducing operation, on the lower part of electrode 2. Advantageously, the metal cup 25 is spot welded to the protuberance 5 of electrode 2.

Over the unit thus formed, a synthetic casing 15 is molded as hereabove described. This casing leaves the protuberance 26 of the metal cup 25 bare. It fills up the slots S of the negative electrode on their whole height and forms above the upper end of this electrode a ledge 16.

A cardboard disc 24 is placed, e.g., by a stamping operation on the bottom of electrode 2 and inside it, and then a centering shallow cup 23, made e.g., of Kraft paper is mounted on cardboard disc 24. Then the electrolyte gel 22 is introduced. Thereafter, the depolarizer mass 17 is introduced into which the carbon rod 18 is driven as described above. The electrolyte gel 22 also fills up the gap between the centering cup 23, the electrode 2 and disc 24.

A cover 19 made of synthetic material, completes the cell as described in relation to FIG. 10.

The embodiment shown in FIG. 12 mainly differs from that of FIG. 11 in that the bottom 5′ of the negative electrode 2′ has no protuberance. The metal cup 27′ is then provided with ribs 28 protruding as shown in the figure.

Figure 13:
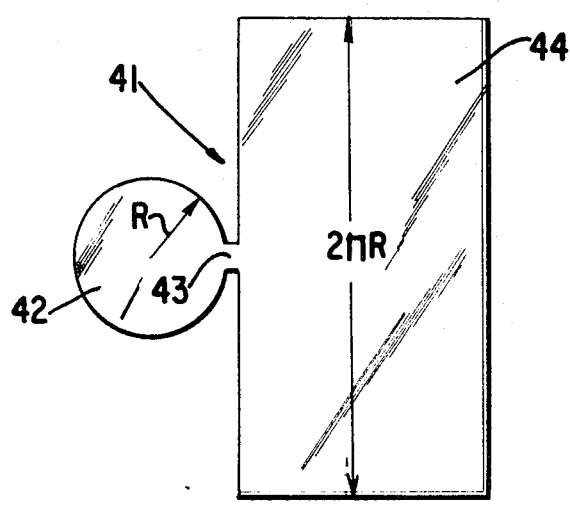
FIG. 13 is a plan view after the cutting operation of another embodiment of a metal sheet that may be used for making the negative electrode.

FIG. 13 is a plan view after a cutting operation of another embodiment of a metal sheet which can be used to make the negative electrode.

In this figure, the metal sheet 41, e.g., made of magnesium is cut so that it has the shape of a disc 42 connected to a rectangular portion 44 by a strip 43.

The radius of disc 42 is R, and is equal to the radius of the completed negative electrode bottom.

The length of the rectangular portion 44 is substantially equal to $2\pi R$ and its width is substantially equal to the desired height of the completed negative electrode.

This electrode is obtained by bowing the rectangular portion 44 so that a cylinder is obtained, then by turning down disc 42 using strip 43 as a hinge.

Figure 14:
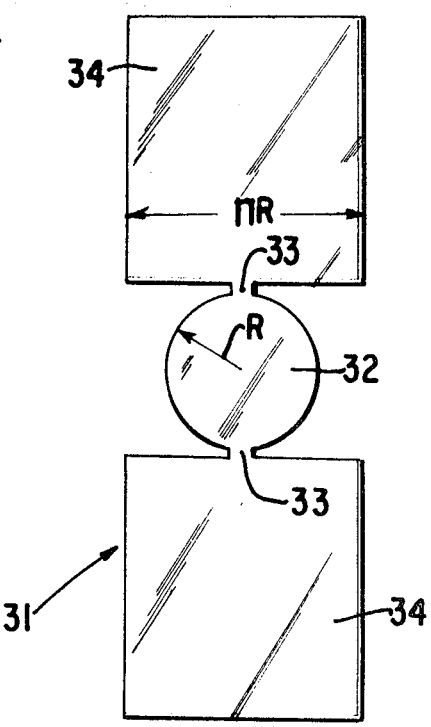
FIG. 14 is another embodiment of a metal sheet for making the negative electrode.

In FIG. 14, a metal sheet 31, e.g., made of magnesium which is intended to constitute the negative electrode of a cell is cut so that a disc 32 is connected by two diametrically opposite strips 33 to two rectangular portions 34. The radius of disc 32 is equal to R, i.e., to the radius of the bottom of the completed negative electrode. The widths of the rectangular portions are substantially equal to $\pi R$ and the lengths are substantially equal to the height of the completed negative electrode. As seen in FIG. 14, the strips 33 have relatively small dimensions.

The two rectangular portions 34 are bowed on a suitable forming tool around an axis passing through the strips 33 so that half cylinders 35 are formed.

Then both half cylinders are turned down using the strips 33 as hinges.

Alternatively, the bowing operation may be made after the turning down operation. The turning down operation may also follow a preparatory bowing operation and be followed by the final bowing operation.

Figure 15:
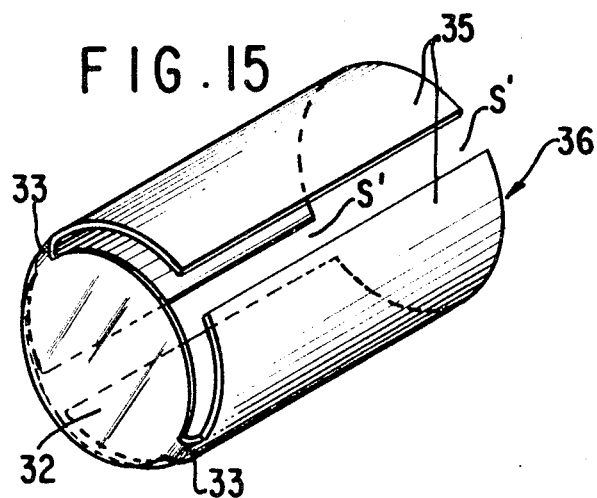
FIG. 15 is a perspective view of the negative electrode obtained from the metal sheet of the embodiment of FIG. 14.

The negative electrode 36 thus obtained is shown in FIG. 15.

Figure 16:
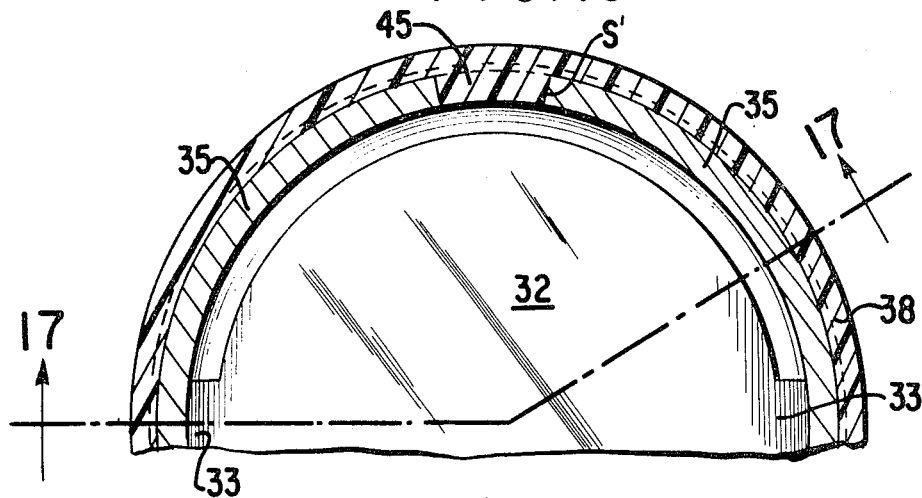
FIG. 16 is a cross-sectional view of the lower part of the negative electrode shown in FIG. 15, coated with the molded synthetic casing.
Figure 17:
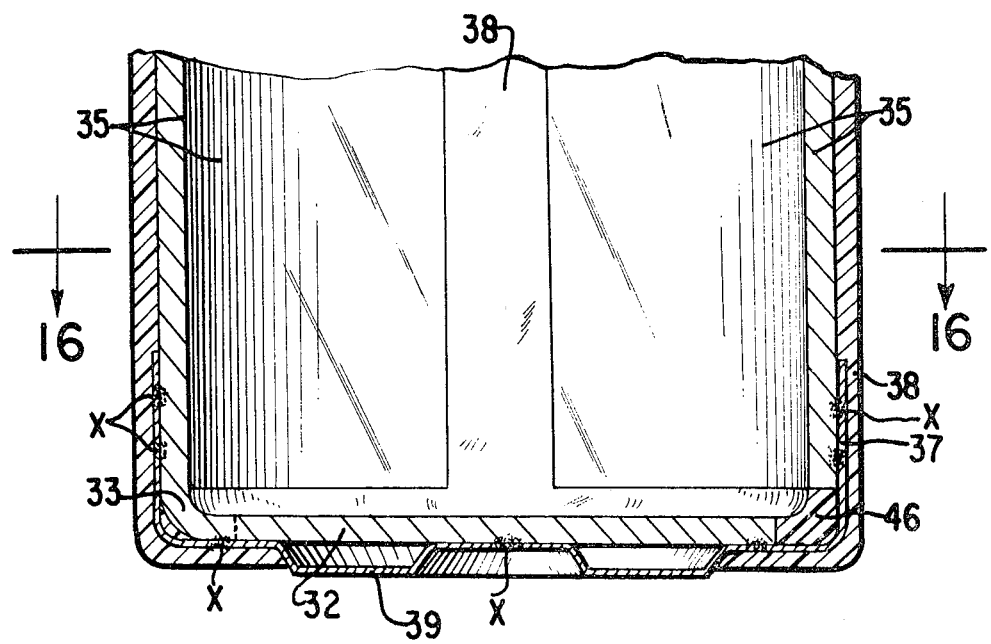
FIG. 17 is a vertical sectional view of a part of the embodiment shown in FIG. 16 as taken along line 17—17 of FIG. 16, said FIG. 16 being a sectional view along line 16—16 of FIG. 17.

As seen in FIG. 16 and 17, when this negative electrode 36 has been shaped, a metal cup 37 is fitted onto the lower part of it, with its cylindrical wall closely engaging the lower part of the two half cylinders 35, the bottom of the metal cup being in contact with disc 32. This metal cup, e.g., of tin coated iron sheet, may be spot-welded at points X to the negative electrode.

Its main purpose is to constitute the negative terminal of the cell. Its presence is rendered necessary by the fact that the connection between the bottom disc 32 of the negative electrode and the half cylinders 35 is only ensured by the strips 33 and that these strips 33 may be consumed or possibly destroyed during the operation of the cell. The metal cup 37 which engages the lower part of half cylinders 35, ensures on the contrary a reliable electrical connection. The negative electrode 36 fitted with the metal cup 37 is then coated by molding the synthetic casing 38 as hereabove described. This casing 38 leaves a central portion of the metal cup 37 bottom bare.

Figure 18:
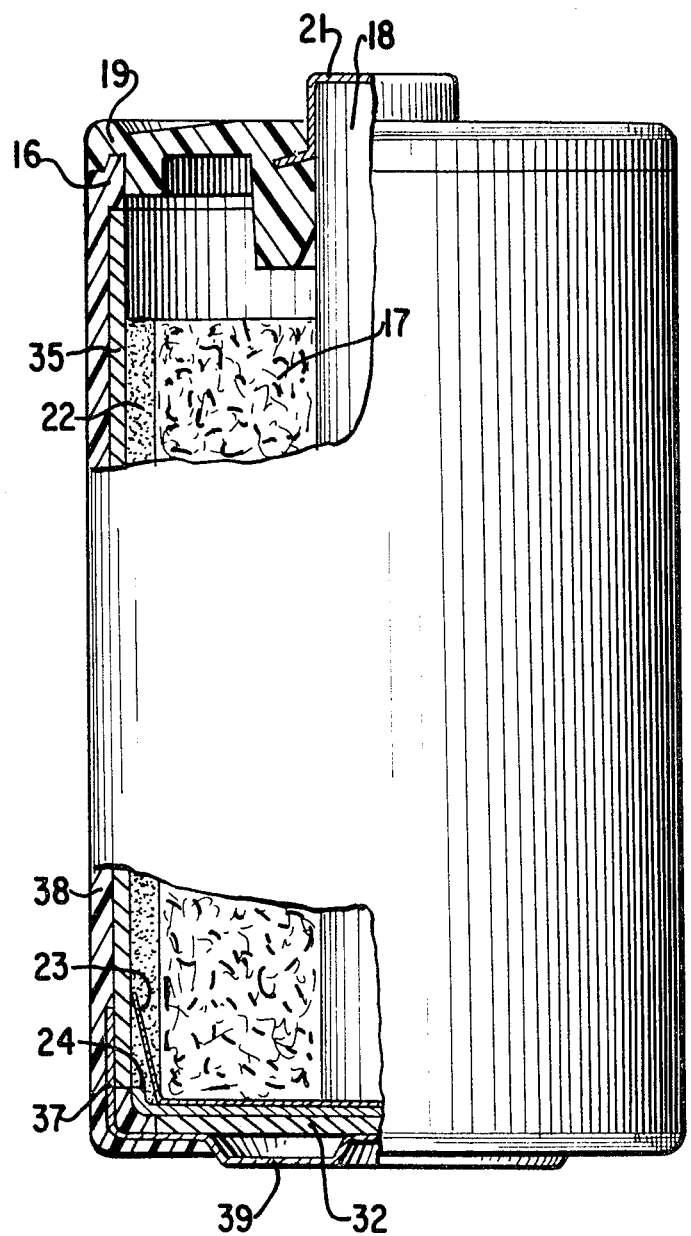
FIG. 18 is a partly sectional view of a cell according to the invention comprising the electrode shown in FIG. 15.

This coating 38 also fills up the slots S′ situated between the two half cylinders 35, as well as the gap between these and the bottom disc of the negative electrode (see FIG. 16), however without covering the inner face of the said electrode bottom. The casing 35 also forms a ledge 16′ above the electrode (FIG. 18).

FIG. 16 is a cross-sectional view of a part of the negative electrode 36 coated with the molded casing 38.

FIG. 17 is a vertical sectional view of the electrode of FIG. 16 along line 17—17 of this figure, FIG. 16 being a cross section along line 16—16 of FIG. 17.

The metal cup 37 and the synthetic casing 38 may be seen in these figures. The cylindrical portion of the metal cup 37 engages the lower part of the half cylinders 35 and its bottom is in contact with disc 32. The synthetic casing 38 covers the negative electrode 36 and the metal cup 37 while leaving the bottom central portion of the said cup bare. It may be seen at 45 that synthetic casing 38 also fills up the slots S′ between the half cylinders 35 as well as at 46 the gap between these half cylinders 35 and the disc 32.

Advantageously, the bottom of the metal cup 37 has at least a portion slightly protruding which is used as negative terminal. This portion may be constituted by ribs 39.

After the molding operation, a complete cup is thus obtained and the other constituents of the cell are put in this cup.

A cardboard disc 24 is introduced in this cup and then a centering shallow cup 23, e.g., made of Kraft paper, then the electrolyte gel 22 is introduced, and after that the depolarizer mass 17 into which is driven a carbon rod 18. The cell is then closed by a synthetic cover 19.

FIG. 18 is a partly sectional view of this cell. The centering cup 23 and cardboard disc 24 may be seen in this figure as well as the electrolyte gel 22 and the depolarizer mass 17. The carbon rod 18 is covered by a metal cap 21. The cover 19 which comprises a central bore 20 around the rod 18 is fitted on ledge 16 of casing 38. The bottom of the metal cup 37 is shown with a rib 39 protruding and constituting the negative terminal.

The method of forming the negative electrode 36 as described in connection with FIGS. 13 and 14 is particularly advantageous for metals which cannot be easily stamped such as magnesium.

It is well understood that the invention is in no way limited to the embodiments described and shown which have only been given as examples. More particularly, it would be possible, without departing from the scope of the claimed invention, to modify some details, change some dispositions or replace some means by equivalent means.

What is claimed is:

1. A sealed electrochemical cell of the type comprising a tubular container-shaped negative electrode enclosing a depolarizer mass surrounding conductive rod serving as a positive electrode, one end of said rod protruding from one end of said tubular negative electrode to provide a positive terminal for the cell, said negative electrode comprising a tube whose wall has noncontiguous edges defining at least one slot extending substantially the whole length of said wall, a metallic disc at the other end of said tubular negative electrode, at least one strip linking said disc to said tubular electrode, said disc serving as the bottom of said tubular negative electrode, and an outer casing molded in situ and of synthetic material coating all of the exterior wall of said negative electrode and underlying said bottom except in the central portion of the bottom and said material also filling up to each such slot.

2. A cell according to claim 1, wherein a metal cup is fitted on the lower portion of the negative electrode, the said metal cup having its sidewall portion engaging the lower portion of the negative electrode and its bottom portion in contact with the bottom of said electrode, the synthetic casing material covering the said metal cup except on a central portion of the bottom of said metal cup, the said last-named central portion of the bottom of said metal cup constituting the negative terminal of the cell.

3. A cell according to claim 2, wherein at least a portion of the bottom of the metal cup is in electrical contact with the bottom of the negative electrode.

4. A cell according to claim 3 wherein the bottom of the metal cup presents an outwardly directed protuberance.

5. A cell according to claim 3, wherein the bottom of the metal cup is provided with protruding portions in the form of ribs.

6. A cell according to claim 2, wherein the metal cup is spot-welded to the negative electrode.

7. An electrochemical cell according to claim 1 wherein said negative electrode has the shape of a cylinder slotted along at least one generatrix and said disc is linked by at least one strip to the cylinder.

8. A cell according to claim 7, wherein the cylinder is slotted along two diametrically opposite generatrices providing two substantially half cylinders and at least one such strip linking said disc to each of said half cylinders.

9. An electrochemical generator of the type comprising a negative electrode containing a rodlike positive electrode, a depolarizer mass surrounding said positive electrode, electrolyte and separator means, said negative electrode being of sheet metal with a cylindrical sidewall, said sidewall having at least one slot extending for substantially the entire length of said wall along at least one generatrix, a metal disc forming a bottom of said negative electrode and at least one strip joining the disc to said sidewall, there being gaps between the disc and sidewall, a molded outer casing of synthetic insulative material surrounding said sidewall and also filling each slot therein, the material of said casing also penetrating said gaps, and cover means joined to said casing and sealing in the contents of the generator.

10. An electrochemical generator according to claim 9, wherein said sidewall has a pair of slots along two diametrically opposite generatrices, both of which slots are filled by the material of said casing.

11. An electrochemical generator according to claim 9 including terminal means for said positive electrode in said cover means and terminal means for said negative electrode.

12. An electrochemical generator according to claim 9 including positive terminal means for said positive electrode in said cover means and a bare protuberance on the bottom of said negative electrode serving as a negative terminal.

13. An electrochemical generator according to claim 9 including positive terminal means for said positive electrode in said cover means and a metallic cup in contact with said bottom of said negative electrode and having bared portions serving as a negative terminal, said cup being also partially covered by the material of said casing.

14. An electrochemical generator according to claim 13 in which said metallic cup is spot-welded to said bottom.

15. An electrochemical generator according to claim 9 including an insulative disc positioned internally at the bottom of said negative electrode which is joined to the externally located insulative casing.

16. A cell according to claim 1 wherein the synthetic casing has a ledge above said one edge of the negative electrode, and a cover of synthetic material fitted onto the ledge and having a central bore tightly surrounding said rod adjacent its protruding end.

* * * * *